(12) United States Patent
Goleski et al.

(10) Patent No.: US 10,245,951 B2
(45) Date of Patent: Apr. 2, 2019

(54) HYBRID TRANSMISSION WITH DUAL-DRIVE PUMP

(71) Applicant: Ford Global Technologies, LLC, Dearborn, MI (US)

(72) Inventors: Gregory Daniel Goleski, Rochester Hills, MI (US); David Allen Janson, Plymouth, MI (US); Jeffrey Edward Maurer, Commerce, MI (US); Matthew David Hammond, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 15/662,339

(22) Filed: Jul. 28, 2017

(65) Prior Publication Data

US 2019/0031026 A1    Jan. 31, 2019

(51) Int. Cl.
| | |
|---|---|
| *F16D 41/00* | (2006.01) |
| *B60K 25/06* | (2006.01) |
| *B60K 6/48* | (2007.10) |
| *F16H 55/30* | (2006.01) |
| *F16H 7/06* | (2006.01) |
| *B60K 6/44* | (2007.10) |

(52) U.S. Cl.
CPC ............... *B60K 25/06* (2013.01); *B60K 6/44* (2013.01); *B60K 6/48* (2013.01); *F16D 41/00* (2013.01); *F16H 7/06* (2013.01); *F16H 55/30* (2013.01); *B60K 2006/4808* (2013.01)

(58) Field of Classification Search
CPC .. B60K 25/06; B60K 6/44; B60K 6/48; F16D 41/00; F16H 7/06; F16H 55/30
See application file for complete search history.

(56) References Cited

U.S. PATENT DOCUMENTS

| | | | |
|---|---|---|---|
| 5,474,428 A | 12/1995 | Kimura et al. | |
| 7,086,977 B2 | 8/2006 | Supina et al. | |
| 8,689,759 B2 | 4/2014 | Schultz | |
| 8,905,724 B2 * | 12/2014 | Hwang | F16D 41/066 192/48.8 |

* cited by examiner

*Primary Examiner* — Mark J Beauchaine
(74) *Attorney, Agent, or Firm* — David Kelley; Brooks Kushman P.C.

(57) ABSTRACT

In a pump system for a hybrid electric transmission, the pump is alternately driven by the input shaft and the output shaft, whichever is rotating faster. The input shaft and output shaft are co-axial. Sprockets and a chain transmit power from axis of the input and output shafts to the axis of the pump. The driven sprocket is selectively coupled to the input shaft by a first one-way-clutch and selectively coupled to the output shaft by a second one-way-clutch. Two alternative one-way-clutch and bearing arrangement are disclosed.

15 Claims, 3 Drawing Sheets

HYBRID TRANSMISSION WITH DUAL-DRIVE PUMP

TECHNICAL FIELD

This disclosure related to the field of hybrid electric vehicles. More particularly, the disclosure relates to an engine-driven off-axis pump drive system designed to sustain pump drive when a vehicle is propelled electrically.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Transmission components such as gears and bearings require lubrication. Commonly, a transmission case contains a supply of lubrication fluid which tends to collect in the lowest portion of the case, called the sump. A pump may be utilized to distribute the lubrication fluid from the sump to each of the components that requires lubrication.

In order to reduce fuel consumption, some vehicles include hybrid powertrains which utilize energy storage to supplement the power produced by the internal combustion engine. These powertrains permit the vehicle to operate a portion of the time with the engine off and the remainder of the time at torque levels at which the engine is more efficient. Hybrid powertrains also enable the capture and later use of energy that would otherwise be dissipated by the braking system.

SUMMARY

A hybrid transmission includes input and output shafts, a motor, driving and driven sprockets, a chain, and a pump. The input shaft is adapted for fixation to an internal combustion engine. The output shaft is co-axial with the input shaft and drivably connected to a differential. The motor is configured to propel the output shaft with the input shaft stationary. The driving sprocket is selectively coupled to the input shaft by a first one-way-clutch and selectively coupled to the output shaft by a second one-way-clutch. The driving sprocket may be supported by the input shaft via a combined bearing and one-way-clutch. In some embodiments, the second one-way-clutch may act on a radially outer surface of the driving sprocket and a radially inner surface of the output shaft. In some embodiments, the driving sprocket may include an inner member splined to an outer member. The inner member may be selectively coupled to the input shaft while the outer member is selectively coupled to the output shaft. The chain engages both the driving sprocket and the driven sprocket. The pump is drivably connected to the driven sprocket.

In some embodiments, a hybrid transmission includes first and second sprockets, a first electric machine, and a pump. The first and second sprockets are drivably connected to one another by a chain. The first sprocket is selectively coupled to an input shaft by a first one-way-clutch and selectively coupled to an output shaft by a second one-way-clutch. The first electric machine is configured to propel the output shaft with the input shaft stationary. The pump is driven by the second sprocket. The hybrid transmission may also include a simple planetary gear set having a sun gear fixedly coupled to a second electric machine, a carrier fixedly coupled to the input shaft, and a ring gear drivably connected to the output shaft and driveably connected to the first electric machine.

A pump system for a hybrid transmission includes first and second sprockets and a pump. The first and second sprockets are drivably connected to one another by a chain. The first sprocket is selectively coupled to an input shaft by a first one-way-clutch and selectively coupled to an output shaft by a second one-way-clutch. The first sprocket may be supported by the input shaft via a combined bearing and one-way-clutch. In some embodiments, the second one-way-clutch may act on a radially outer surface of the first sprocket and a radially inner surface of the output shaft. In some embodiments, the first sprocket may include an inner member splined to an outer member. The inner member may be selectively coupled to the input shaft while the outer member is selectively coupled to the output shaft. The input shaft is adapted for connection to an internal combustion engine and the output shaft is adapted to drive vehicle wheels. The pump is driven by the second sprocket.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
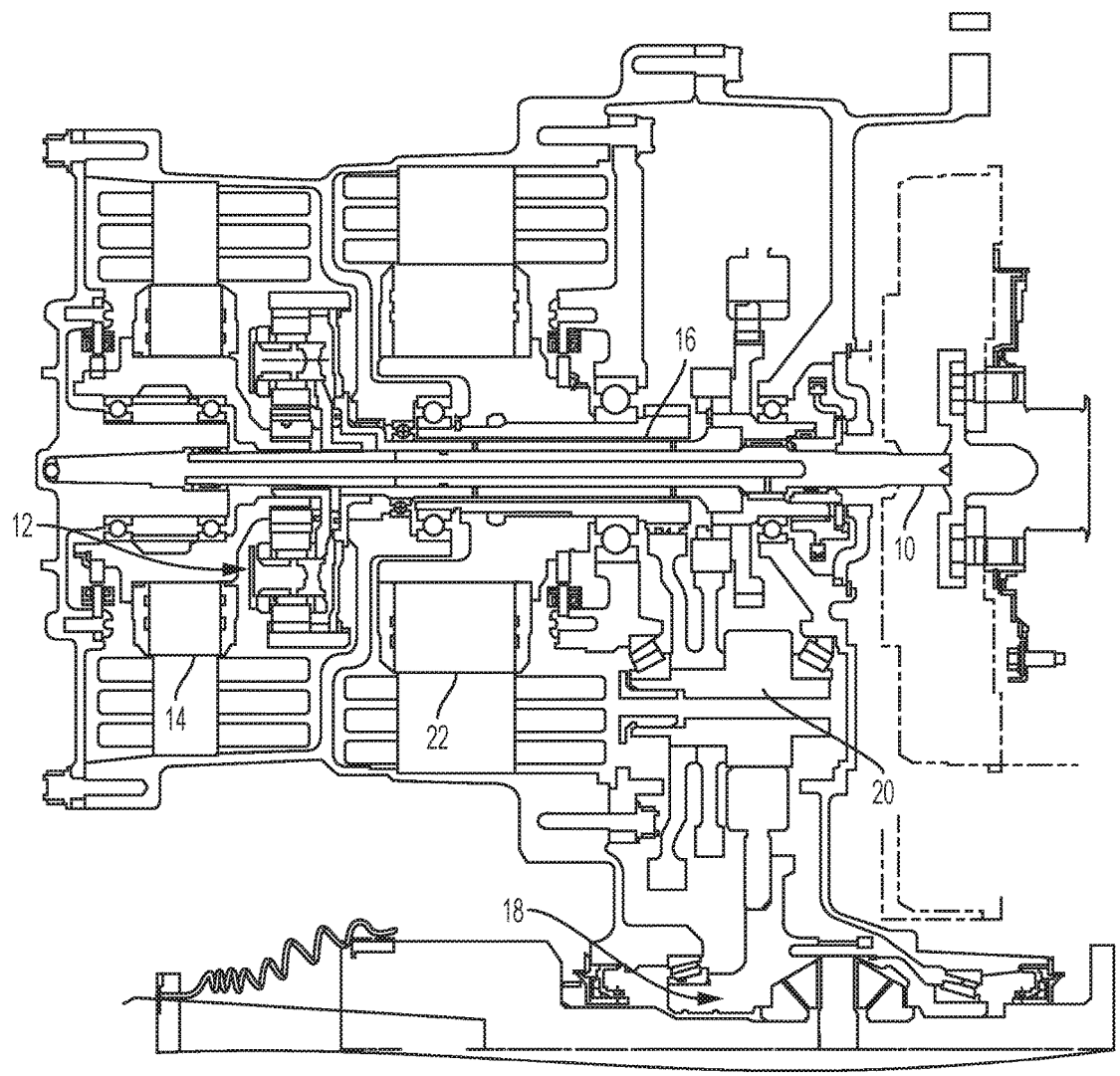
FIG. 1 is a cross section a hybrid vehicle powertrain.

FIG. 1 is a cross section of a hybrid transmission. Mechanical power is supplied at input shaft 10 from an internal combustion engine. Input shaft 10 is fixedly coupled to the carrier of simple planetary gear set 12. The rotor 14 of a first electric machine is fixedly coupled to the sun gear of planetary gear set 12. Output shaft 16 is fixedly coupled to the ring gear of planetary gear set 12. Power is transmitted from output shaft 16 to differential 18 via intermediate shaft 20. The rotor 22 of a second electric machine is located co-axially with input shaft 10 and output shaft 16 and also drives intermediate shaft 20, although at a different gear ratio than output shaft 16.

The stators of each of the two electrical machines are electrically connected to inverters. The inverters control the current such that a desired level of torque is exerted on the respective rotor. In some operating modes, an electric machine absorbs electrical power and produces mechanical power. In other operating modes, an electric machine absorbs mechanical power and produces electrical power. Any net electrical power generated by the two electric machines is stored in a battery. In other operating modes, the battery provides electrical power. In some modes of operation, the internal combustion engine may be shut off and all power is provided by the battery driving the second electric machine.

The bearings and the meshing gears need lubrication to operate efficiently and to avoid accelerated wear. The lubricant also extracts heat from components. The lubricant naturally drains to the lowest region of the transmission case, which is called the sump. Some lubricant may be distributed from the sump to various components by the splashing. However, it is preferable to systematically distribute the lubricant to components. Conventionally, lubricant is distributed by a pump driven by the input shaft. However, when the internal combustion engine is not running, the input shaft does not rotate. Unless lubricant can be distributed effectively during battery-only modes of operation, the controller must limit the duration of operation in such modes, reducing the fuel economy potential of the powertrain.

Figure 2:
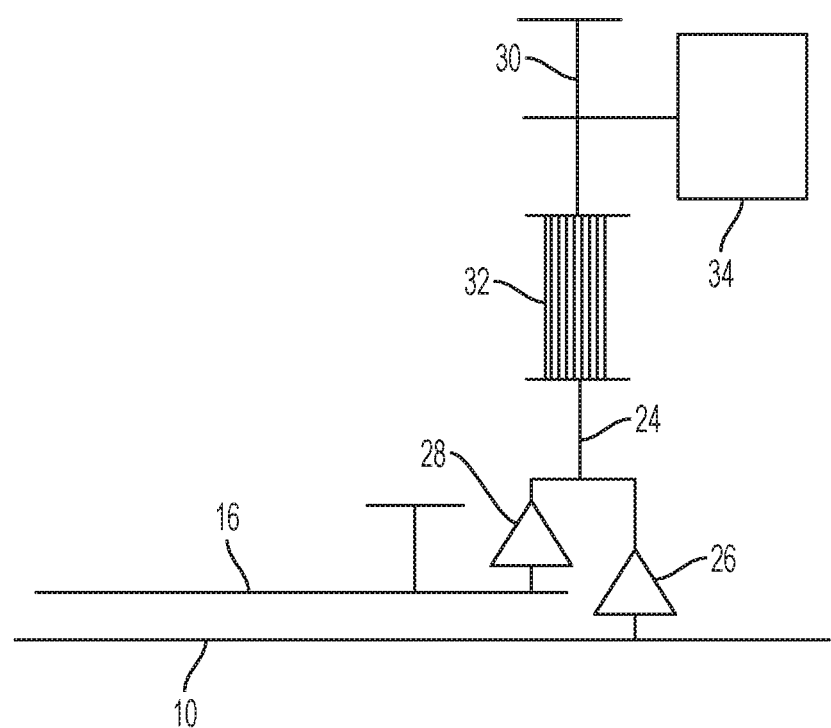
FIG. 2 is a schematic diagram of a pump drive mechanism suitable for use in the hybrid vehicle powertrain of FIG. 1.

FIG. 2 shows the pump drive mechanism of the transmission of FIG. 1. When input shaft 10 is rotating faster than output shaft 16, driving sprocket 24 is driven by the input shaft via first one-way-clutch 26. When output shaft 16 is rotating faster than input shaft 10, driving sprocket 24 is driven by the output shaft via second one-way-clutch 28. Driving sprocket 24 is supported for rotation on the same axis as the axis of rotation of input shaft 10 and output shaft 16. Driven sprocket 30 is supported for rotation about a second axis. Chain 32 wraps around driving sprocket 24 and driven sprocket 30 engaging teeth on each sprocket such that the speeds of the two sprockets are proportional. Pump 34 is fixedly coupled to driven sprocket 30.

Figure 3:
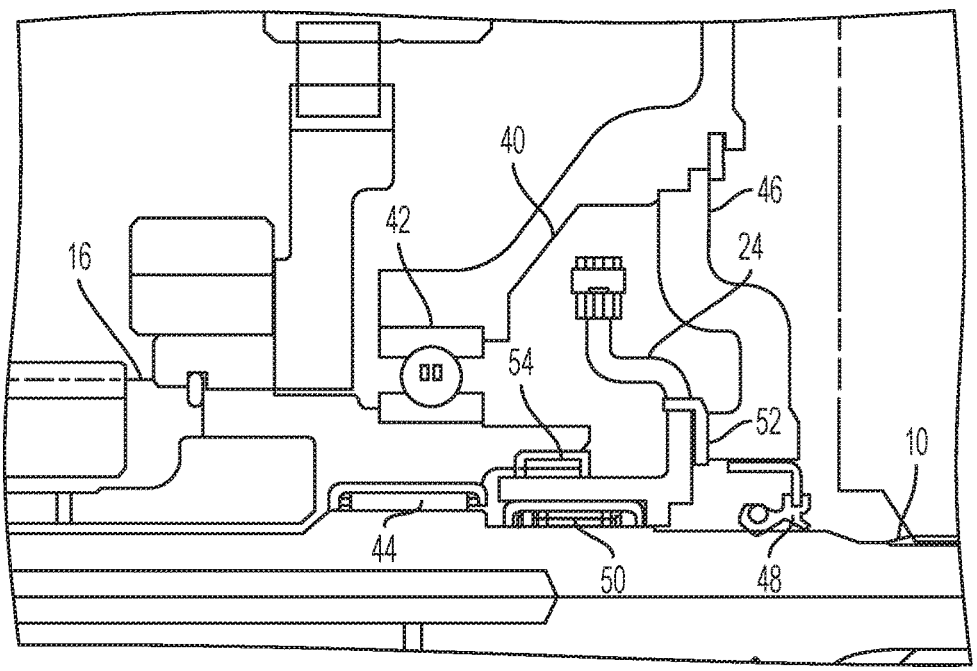
FIG. 3 is a cross section of a first embodiment of the pump drive mechanism of FIG. 2.

FIG. 3 shows a cross section of the driven sprocket support of a first embodiment of the pump drive. Output shaft 16 is supported on one end by transmission case 40 via ball bearing 42. Input shaft 10 is supported on one end by output shaft 16 via roller bearing 44. Cover 46 and seal 48 enclose the input end of the transmission at the input shaft. Driven sprocket 24 is supported radially by input shaft 10 via combined bearing and one-way-clutch 50. Combined bearing and one-way-clutch 50 includes three sets of rollers. The outer race is circular around the outer rollers which serve as bearings. The outer race has inclined surfaces around the middle set of rollers such that the rollers are pinched between the shaft and the outer race whenever sprocket 24 momentarily rotates slower than input shaft 10. After a slight relative displacement, this pinching couples sprocket 24 to shaft 10 such that they rotate at the same speed. Positive rotation of driven sprocket 24 relative to input shaft 10 relieves the pinching to allow unrestricted relative rotation in that direction. Driven sprocket 24 is axially located by bushing 52. One way clutch 54 is structured similarly to the inner portion of assembly 50 to permit driven sprocket 24 to rotate faster than output shaft 16 and couple them in response to slight relative rotation in the opposite direction.

Figure 4:
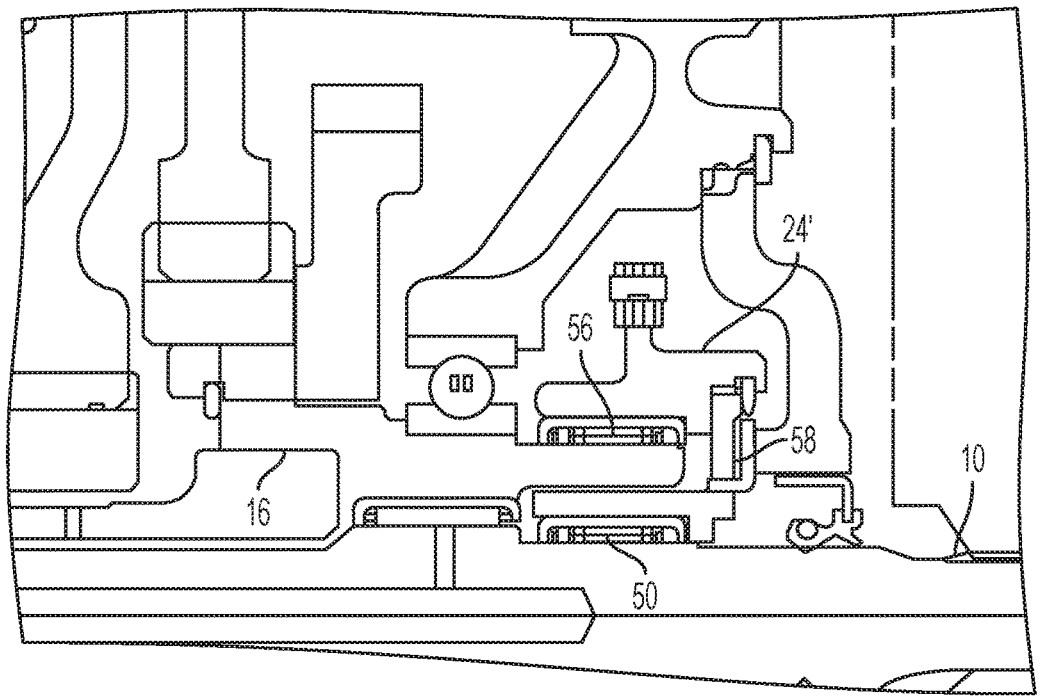
FIG. 4 is a cross section of a second embodiment of the pump drive mechanism of FIG. 2.

FIG. 4 shows a cross section of the driven sprocket support of a second embodiment of the pump drive. Driven sprocket 24' is supported radially by output shaft 16 via combined bearing and one-way-clutch 56. Sprocket hub 58 is supported radially by input shaft 10 via combined bearing and one-way-clutch 50. Sprocket hub 58 and sprocket 24' are joined by a spline that forces them to rotate at the same speed but accommodates slight differences in axis of rotation. In this way, the concentricity tolerance is much less critical.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hybrid transmission comprising:
an input shaft adapted for fixation to an internal combustion engine;
an output shaft co-axial with the input shaft and driveably connected to a differential;
a motor configured to propel the output shaft with the input shaft stationary;
a driving sprocket selectively coupled to the input shaft by a first one-way-clutch and selectively coupled to the output shaft by a second one-way-clutch;
a driven sprocket;
a chain engaging both the driving sprocket and the driven sprocket; and
a pump driveably connected to the driven sprocket.

2. The hybrid transmission of claim 1 wherein the driving sprocket is supported by the input shaft via a combined bearing and one-way-clutch assembly.

3. The hybrid transmission of claim 2 wherein the second one-way-clutch acts on a radially outer surface of the driving sprocket and acts on a radially inner surface of the output shaft.

4. The hybrid transmission of claim 1 wherein the driving sprocket includes an inner member splined to an outer member, the inner member selectively coupled to the input shaft by the first one-way-clutch and the outer member selectively coupled to the output shaft by the second one-way-clutch.

5. The hybrid transmission of claim 4 wherein the inner member is supported by the input shaft via a first combined bearing and one-way-clutch assembly.

6. The hybrid transmission of claim 4 wherein the outer member is supported by the output shaft via a second combined bearing and one-way-clutch assembly.

7. A hybrid transmission comprising:
first and second sprockets drivably connected to one another by a chain, the first sprocket selectively coupled to an input shaft by a first one-way-clutch and selectively coupled to an output shaft by a second one-way-clutch;
a first electric machine configured to propel the output shaft with the input shaft stationary; and
a pump driven by the second sprocket.

8. The hybrid transmission of claim 7 further comprising:
a simple planetary gear set having a sun gear fixedly coupled to a second electric machine, a carrier fixedly coupled to the input shaft, and a ring gear drivably connected to the output shaft and driveably connected to the first electric machine.

9. The hybrid transmission of claim 7 wherein the first sprocket is supported by the input shaft via a combined bearing and one-way-clutch assembly.

10. The hybrid transmission of claim 9 wherein the second one-way-clutch acts on a radially outer surface of the first sprocket and acts on a radially inner surface of the output shaft.

11. The hybrid transmission of claim 7 wherein the first sprocket includes an inner member splined to an outer member, the inner member selectively coupled to the input shaft by the first one-way-clutch and the outer member selectively coupled to the output shaft by the second one-way-clutch.

12. A pump system for a hybrid transmission comprising:
first and second sprockets drivably connected to one another by a chain, the first sprocket selectively coupled to an input shaft by a first one-way-clutch and selectively coupled to an output shaft by a second one-way-clutch, the input shaft adapted for connection to an internal combustion engine and the output shaft adapted to drive vehicle wheels; and
a pump driven by the second sprocket.

13. The hybrid transmission of claim 12 wherein the first sprocket is supported by the input shaft via a combined bearing and one-way-clutch assembly.

14. The hybrid transmission of claim 13 wherein the second one-way-clutch acts on a radially outer surface of the first sprocket and acts on a radially inner surface of the output shaft.

15. The hybrid transmission of claim 12 wherein the first sprocket includes an inner member splined to an outer member, the inner member selectively coupled to the input shaft by the first one-way-clutch and the outer member selectively coupled to the output shaft by the second one-way-clutch.

* * * * *